United States Patent
Brughuis (10) Patent No.: US 9,103,121 B2
(45) Date of Patent: Aug. 11, 2015

(54) METHOD OF ASSEMBLING A WALL FROM PREFABRICATED WALL PARTS AND A WALL ASSEMBLY

(75) Inventor: Franciscus Johannes Brughuis, Enschede (NL)

(73) Assignee: MECAL B.V., Enschede (NL)

( * ) Notice: Subject to any disclaimer, the term of this patent is extended or adjusted under 35 U.S.C. 154(b) by 0 days.

(21) Appl. No.: 14/237,078

(22) PCT Filed: Aug. 6, 2012

(86) PCT No.: PCT/NL2012/050549
§ 371 (c)(1),
(2), (4) Date: Mar. 14, 2014

(87) PCT Pub. No.: WO2013/022341
PCT Pub. Date: Feb. 14, 2013

(65) Prior Publication Data
US 2014/0202107 A1    Jul. 24, 2014

(30) Foreign Application Priority Data

Aug. 5, 2011 (NL) .................................. 2007231

(51) Int. Cl.
| | | |
|---|---|---|
| *E04B 1/68* | (2006.01) | |
| *E04F 15/14* | (2006.01) | |
| *E04B 1/686* | (2006.01) | |
| *E04C 1/40* | (2006.01) | |
| *E04B 1/04* | (2006.01) | |
| *E04H 12/12* | (2006.01) | |

(52) U.S. Cl.
CPC . *E04C 1/40* (2013.01); *E04B 1/046* (2013.01); *E04B 1/6803* (2013.01); *E04H 12/12* (2013.01); *Y02E 10/728* (2013.01)

(58) Field of Classification Search
CPC ...... E04F 15/02005; E04B 1/68; E04B 1/948; E04B 1/6812; E04B 1/6803; E04B 1/161
USPC ............ 52/393, 396.04, 583.1, 259; 403/288, 403/268
See application file for complete search history.

(56) References Cited

U.S. PATENT DOCUMENTS

| | | | | |
|---|---|---|---|---|
| 3,604,169 | A * | 9/1971 | Smith ........................ | 52/396.04 |
| 3,803,788 | A * | 4/1974 | Artmann ........................ | 52/417 |
| 4,006,570 | A * | 2/1977 | Stolz ............................. | 52/432 |
| 5,228,257 | A * | 7/1993 | Bowersox et al. ........... | 52/588.1 |
| 2009/0025304 | A1 * | 1/2009 | Irniger et al. ..................... | 52/40 |
| 2011/0179735 | A1 | 7/2011 | Paetrow et al. | |

FOREIGN PATENT DOCUMENTS

| | | |
|---|---|---|
| AT | 507263 | 3/2010 |
| CN | 1566584 A | 1/2005 |

(Continued)

*Primary Examiner* — Brian Glessner
*Assistant Examiner* — Paola Agudelo
(74) *Attorney, Agent, or Firm* — Hoffmann & Baron, LLP (57) ABSTRACT

A method of assembling a wall from prefabricated wall parts, wherein
  edge surfaces of two wall parts are placed against each other leaving a gap there between, and wherein
  first and second sealing members are included in the gap to each act between said edge surfaces of the wall parts, which sealing members extend in a longitudinal direction of said edge surfaces and are spaced apart in a transverse direction of said edge surfaces to define a cavity there between, and wherein
  said cavity is filled with a solidifying liquid, such that the solidifying liquid acts on a cavity facing surface of each sealing member and presses the sealing member into engagement with at least one of the edge surfaces.

14 Claims, 6 Drawing Sheets

(56) References Cited

FOREIGN PATENT DOCUMENTS

| CN | 20171393 U | 1/2011 |
| DE | 8809399 | 9/1988 |
| DE | 20200901357 | 1/2011 |
| FR | 2610023 | 7/1988 |
| FR | 2687711 A1 * | 8/1993 | ................ E04B 1/41 |
| WO | 0151740 | 7/2001 |
| WO | 03069099 | 8/2003 |
| WO | 2008110309 | 9/2008 |

* cited by examiner

METHOD OF ASSEMBLING A WALL FROM PREFABRICATED WALL PARTS AND A WALL ASSEMBLY

This application is the U.S. National Phase of, and Applicants claim priority from, International Patent Application Number PCT/NL2012/050549 filed 6 Aug. 2012, which claims priority from NL 2007231 filed 5 Aug. 2011, each of which is incorporated herein by reference.

The invention relates to assembling walls from prefabricated parts.

Wall assemblies are known in the construction industry, where prefabricated wall parts are assembled to form a wall. Mostly, after assembling a wall a gap is present between the different wall parts. Often, this gap is closed off by filling it up with mortar, foam or epoxy. However, filling the gaps with mortar is time consuming and can be dangerous if done at hazardous places, e.g. at great heights or at places that are difficult to reach. Furthermore, current techniques of closing gaps between walls may result in leakage of water through said gap, partly because during filling of the gap with mortar, the mortar can fall or run out of the gaps during application, leaving holes, gaps and/or cavities for water to enter. In some cases the leakage can have disastrous effect, for example leaking water can get through holes, gaps and/or cavities into contact with electric wiring possibly causing short wiring or the leaking water may freeze inside gaps and/or cavities resulting in cracking and/or breaking of the wall.

In particular, when building the wall of a tower of a wind turbine from prefabricated concrete wall parts, manipulating the relatively heavy concrete wall parts is difficult, and may cause the gaps between the wall parts to be somewhat irregular at places. For example, such wall parts may be about 1-3 m wide, 5-25 m tall and 0.1-0.5 m thick, and may have a weight of several ten thousand kilograms, e.g. more than 30.000 kg. These heavy parts are difficult to lift to the great heights required, e.g. more than 50 m. In particular, when several such elongate wall parts are placed in a ring, it is difficult to obtain proper sealing of the upwardly extending gaps between the wall parts. Especially when the tower includes several such rings on top of each other, efficient and reliable closing of the gaps such that they are aesthetic and remain watertight is a problem. In this respect it is noted that once part of the wall, the wall parts are almost impossible to realign or replace.

An object of the invention is therefore to provide a wall assembly that mitigates at least one of the above mentioned drawbacks.

Thereto, the invention provides a method of assembling a wall from prefabricated wall parts, wherein edge surfaces of wall parts are placed against each other leaving a gap there between, and wherein first and second sealing members are included in the gap to each act between said edge surfaces of the wall parts, which sealing members extend in a longitudinal direction of said edge surfaces and may be spaced apart in a transverse direction of said edge surfaces to define a cavity there between and wherein said cavity is filled with a solidifying liquid, such that the solidifying liquid acts on a cavity facing surface of each sealing member and presses the sealing member into engagement with at least one of the edge surfaces.

The sealing members extend in a longitudinal direction of said edge surfaces and may be spaced apart in a transverse direction of said edge surfaces to define a cavity there between. By including the sealing members in between the gap, the entrances to the cavity may be effectively sealed against environmental influences. Environmental influences may e.g. originate from weather such as rain or dampness, vegetation or animals. In particular the sealing members create a water tight closure to the cavity, such that no water may enter through and/or into the cavity.

However, also passage from the cavity to the environment, passing along the sealing members may be effectively sealed.

By filling the cavity with a solidifying liquid the fluid may act on the cavity facing surface of the sealing member. The sealing member may prevent that during filling of the cavity with a solidifying liquid, the sealing members may not leak, such that the solidifying liquid runs out of the cavity, because when filling the cavity with filling material, pressure on the sealing members may occur. The sealing members can be sufficiently stiff to withstand these forces, such the sealing member will not fail by being released, slipped or pulled away from either wall part. However, at the same time the sealing member may be flexible enough, such that expansion and/or temperature fluctuation of the solidifying liquid may be accommodated by the flexibility of the sealing members, even at later date when the solidifying liquid has solidified. The sealing member may also protect the solidifying liquid against aging and/or erosion due to e.g. environmental influences.

By filling the cavity with a solidifying liquid, forces in the wall assembly, if present, may be easier transferred via the solidifying liquid in the cavity from one wall part to the other.

The cavity may be fully or partly filled with any desired amount of solidifying liquid.

Upon filling the cavity with solidifying liquid, the solidifying liquid may be fluid where after the liquid may solidify. The solidifying liquid may solidify while being introduced into the cavity, or may start solidifying after introduction into the cavity. The solidifying liquid may comprise mortar, concrete, foam, epoxy or any other suitable solidifying liquid material used in the construction industry.

The filling material, either in a fluid state or a rigid state, may make the wall more stiff and/or permanent. The filling material may adhere to the first and/or second wall part and/or the sealing members, such that the wall parts, sealing members and filling material form an integral part.

The sealing members may be flexible to allow some leeway and/or tolerance and/or deformation during assembly, in case the first and second wall part are not perfectly aligned, whilst still being able to act with said edge surfaces. The flexibility may ensure that the sealing members may not damage, break, rip or tear in case foreign objects collide with the sealing members during assembly or at any other time during its lifetime. The sealing members may be provided to the wall parts prior to assembly. For example, one of the sealing members may be provided on the first wall part, whereas the second sealing member may be provided on the second wall part or vice versa. Also, both sealing members may be provided to either one of the wall parts.

By providing the sealing members to the first and/or second wall part before assembly of the first and second wall part, the assembly may be constructed more quickly as no time consuming applying of the sealing members has to be done on site. Further, applying the sealing members before assembly, placement of the sealing members at difficult to access gaps may be omitted.

Further, the sealing members may be compressed when the two wall parts are placed against each other during assembly. The compression of the sealing members between the wall parts may make sure that the sealing members are kept in place during filling of the cavity with the solidifying liquid.

The sealing members may include a lip, and, upon placement of the edge surfaces against each other, a free edge of the lip may be guided to curl inwardly relative to the cavity by a guide portion on the edge surface of the prefabricated wall element. The expression that the sealing members may include a lip is to be construed that e.g. one of the sealing members may have a lip and the other one of the sealing members may not have a lip and may e.g. be a rubber block or a sponge or even a tape seal. Also, both sealing members may have a lip. The lips may be made of a flexible material to better being able to curl and/or follow the contour of the guide portion, such that optimal sealing properties may be reached.

By using a sealing member that includes a lip, the free edge of the lip may be easily deformed, such that is can be directed in a desirable direction. The sealing members may comprise a thin walled profile having a substantially constant cross-section, in particular a profile having an open cross-section. In particular, however, at least the lip of a sealing member may be a thin walled profile. The wall thickness of the sealing members may be in the range of 2-7 mm, preferably 3-6 mm, in particular about 5 mm. The sealing member may be comprised of a profile having a cross-section shaped as a U, V, L, Y, X, C, J or other suitable shape, such that a free edge of the lip may be guided to curl inwardly relative to the cavity by a guide portion on the edge surface of the prefabricated wall element. The lip of the sealing members may extend along the longitudinal edge surface of the prefabricated wall parts, and may therefore allow to follow irregularities along the longitudinal direction of the longitudinal edge of the wall parts. This is in particular possible, because the lips may be made flexible.

For example, a V-shaped seal may be connected to the first wall part with one leg of the V-shaped sealing member by means of adhesive. During assembly of the wall parts, the other, free leg of the V-shaped sealing member engages with the second wall part or vice versa to be curled inward to the cavity. For example, in an initially undeformed state of the sealing member, the angle between the two legs may be between 35-55 degrees, preferably 40-50 degrees, in particular about 45 degrees.

Fixedly connecting the sealing members may be realized by means of chemical fixing such as adhesive, e.g. contact adhesive, and/or by means of mechanical fixings such as bolts, screws or any other type of connection. Types of contact adhesive that may be used may include Koerapren FU 2030 (DS contact adhesive 650) or Koerapren TH 670.

The guide portion may be a boss and/or protrusion that may be provided on a wall part or may be integrally formed with the prefabricated wall element. A guide portion may also be realized by providing a recess on the edge surface of the prefabricated wall element, wherein the free edge of a lip is able to be guided to curl inwardly relative to the cavity.

The guide portion may also be provided to receive and/or embrace the sealing member provided on the first and/or second wall part during assembly, such that the sealing member may be better kept in place and such that the sealing member can not accidentally be released, slipped or pulled away from either wall part. The guide portion may be dimensioned such that even if some misalignment of the first and second wall parts occurs and/or if the wall parts move relative to each other, the cavity may remain adequately sealed. The guide portion may for example form a form closure with the sealing member.

However, the lip may also be curled inwards in case there is no guide portion available. For example, during assembly a guide portion of a wall part may brake off. The wall part comprising the broken off guide portion may still be effectively used in the assembly to seal the cavity.

Furthermore, the guide portion may be formed such that pressure forces generated by the liquid acting on the cavity facing surface of the sealing member may be transferred to the corresponding wall part.

The solidifying liquid may have a viscosity that is greater than the viscosity of water, such that during filling of the cavity, the solidifying liquid may not run out of the cavity through possible minor gapes and/or openings that have not yet been sealed. The solidifying liquid builds up a pressure in the cavity that is greater than twice the atmospheric pressure. This pressure may act on the sealing member and may help to press the sealing member tight to the edge surfaces. In practice, the liquid pressure may be between 20-50 bar.

Furthermore, the first wall part and the second wall part may be fixedly connected to each other, by means of a mechanical connection. The mechanical connection may comprise a screw connection and/or a hook-hook connection and/or a pin-hole connection. For example both, the first and second wall part may comprise at least one ring. The at least one ring may be attached to the wall parts during manufacturing of the wall part or may be applied during assembly. When placing the first and second wall part to form a gap, both rings may be placed over each other in a layered fashion, were after a securing pin is placed through the rings to connect the two wall parts with respect to each other. However the wall parts may be connected in any other way generally known in the construction industry.

After connecting the wall parts, the cavity may be filled with a solidifying liquid. The solidifying liquid may adhere to the wall parts, either during a liquid phase or during solidifying or in a solidified state.

Although invention includes that edge surfaces of more than two wall parts are placed against each other to form a gap there between, e.g. three of for edge surfaces that define a single gap between them, it is in particular useful to two edge surfaces against each other such that they define the gap between them.

The invention further provides for a wall assembly, including prefabricated wall parts of which edge surfaces may be placed against each other leaving a gap there between, in which gap first and second sealing members may be included that act between said edge surfaces of the wall parts, which sealing members extend in a longitudinal direction of said edge surfaces and are spaced apart in a transverse direction of said edge surfaces to define a cavity there between, and wherein said cavity may be filled with a solidified liquid, such that the solidified liquid may acts on a cavity facing surface of each sealing member and may press the sealing member into engagement with at least one of the edge surfaces.

By providing a sealing member that may be pressed against the edge surfaces, by placing them parallel to each other in a transverse direction, an improved sealing of the cavity can be realized as the pressure working on the cavity facing surface is transferred via the sealing member onto the edge surface. This creates extra friction between the edge surface and the sealing member, such that the seal may withstand more pressure of the solidified liquid that may act on the sealing member to push the sealing member out of the gap. Also the sealing strength against environmental influences may be increased, as the sealing members may be more tightly pressed against the edge surfaces, such that the solidified material pressurizes the seal to improve water tightness. Therefore, the seal members may form a watertight seal against ingress of water into the cavity.

The facing edge surfaces may comprise stop portions that converge in outward direction of the cavity, seen from the center of the gap, to prevent the sealing members from outward movement relative to the cavity. The stop portions may e.g. be placed at or near the extremities of the gap. As the pressure build up in the cavity may be twice the atmospheric pressure, the pressure force that may push the sealing member out of the gap may be counteracted by the stop portions. By narrowing the cavity towards an outside direction of the cavity, the sealing member may be effectively prevented from moving in an outward direction of the cavity. In particular, such a 'self locking' feature of the sealing elements may prevent that solidifying liquid egresses from the cavity under its own hydrostatic pressure. As an alternative, or in addition such a 'self locking' feature may be provided when the cavity facing surfaces of said sealing members comprise a concave portion. By providing the cavity facing surface of the sealing members with a concave portion, cavity outward directed pressure forces acting on the cavity facing surface may be transferred and redirected through the sealing member towards and/or onto either edge surface of the wall parts. This may result in an extra force pressing the sealing members onto the edge surfaces, increasing the sealing ability.

Furthermore, the sealing members may be shaped, such that they include a lip. The lip may comprise a base portion that is carried on one of the edge surfaces and a free edge of the lip portion may cooperate with a guide portion of the facing edge surface. The base portion may be fixedly connected to the edge surface of the wall part by means of adhesive, bolts, screws or any other connection means. The guide portion may be provided at the edge surface of a wall part with which the free edge of the lip may cooperate. The guide portion may comprise a boss or notch that may have a guide surface, wherein the guide portion may be integrally formed with the edge surface or wall part. The guide portion may also comprise a recess. The guide portion may cooperate with the lip during assembly to form an adequately sealed cavity by guiding the lip of the sealing member into a desired shape and onto a desired position against the edge surface. The guide portion may also ensure that during misalignment in the assembling process, the misalignment can be compensated such that the cavity is still properly sealed.

Additionally, by providing a guide portion on either one of the wall parts, it may be ensured that the sealing member will not accidentally open or gape, as to prevent environmental influences like water to enter into the cavity. However, even if no guide portions are provided for the sealing member, the sealing member may at all times be able to compensate for any movements or misalignments of the construction assembly and be able to seal the cavity tightly at all times.

The stop portion may be forming the guide portion or vice versa. The edge surface may be comprised of components, e.g. stop portions and/or guide portions and wall part. The components may be integrally formed with the edge surface.

By having the cavity filled with solidified liquid, forces acting on the wall parts may be better transferred from one wall part to the other. Also, the solidified liquid may make the assembly more stiff and/or rigid.

The solidified liquid may comprise hardened foam, hardened concrete and/or hardened epoxy. However, any other known material in the construction industry may be used.

The sealing member and in particular a lip portion thereof, may comprise or be made of a flexible material. The material may for example comprise a plastic material, e.g. nylon, polyethylene, polypropylene etc, a thermosetting material, e.g. polyester, epoxies silicones etc, a fabric and/or fiber reinforced material comprising a matrix of for example cotton, carbon, linen etc, or elastomers or any combination and/ or blend thereof. For example, the sealing member and in particular a lip portion thereof may be made of rubber, e.g. SEBS or EPDM. A typical hardness of the sealing member material may be between 30-100 durometer hardness on a Shore A scale, preferably however between 50-90 durometer, for example 75 durometer.

The wall parts may be made of concrete, reinforced concrete or any other known mixture of concrete to form prefabricated wall parts.

Further, the first wall part and the second wall part may be fixedly connected to each other by means of a mechanical connection. The mechanical connection may comprise a screw/bolt or other threaded connection and/or a hook-hook connection and/or a pin-hole connection. For example both, the first and second wall part may comprise at least one ring. The at least one ring may be attached to the wall parts during manufacturing of the wall part or may be applied during assembly. When placing the first and second wall part to form a gap, both rings may be placed over each other in a layered fashion, whereafter a securing pin is placed through the rings to connect the two wall parts with respect to each other. However, the wall parts may be connected in any other way generally known in the construction industry.

The wall assembly may be used for building a tower of which the wall includes a number of upward, elongate prefabricated wall parts that are placed with their longitudinal edge surfaces against each other side by side to form a wall assembly wherein the gaps formed between two facing edge surfaces of two consecutive wall parts are sealed according to the foregoing. In particular, wherein the height of a wall part is more than twice the width, e.g. 3 or 4 times the width, e.g. such as disclosed in WO 2008/110309 and WO 03/069099. The long sleek elements can be easily transported on trucks and hoisted up to be placed in rings, forming a tower. Gaps formed between lateral edges, i.e. between two wall parts placed on top of each other, may be sealed using conventional sealing members, such as a compressed block, e.g. a rubber or sponge, and mortar/grout.

The tower may be used for supporting the generator of the wind turbine. Due to the high electric currents flowing through wiring through the inside of the tower, it is important that the inside of the tower is adequately sealed against the ingress of water due to environmental influences that may cause damage or dangerous short wiring.

The elongate prefabricated wall parts may be twice higher than the greatest dimension of the wall part, e.g. the width. A typical height of prefabricated wall section of a wind turbine tower may be between 15-30 meters. Filling a height of a gap of 15-30 meters between two of such wall section may induce liquid pressures of more then twice the atmospheric pressures. Due to the height of the wall parts maximum peak pressures on the sealing members ranging between 20 to 50 bars pressure are possible, and may be accommodated by the sealing members without leaking. In practice, the height of a wall part is not more then approximately 25 meters, such that the wall parts will fit on a truck to transport the wall parts to the construction sites.

Filling the gap with solidifying liquid may be done after the tower has been built, by pouring the solidifying liquid from the top opening of the tower into the cavity. However, filling/ pouring of the cavities with solidifying liquid may also be done per section. In a preferred embodiment, one or more filling openings may be provided on the front and/or rear faces of the wall parts, along the lateral edges of the wall parts, allowing access from the front or rear faces of the wall part to the cavity for pouring solidifying liquid into said cavity. Per wall part multiple of such openings may be provided to guarantee a better distribution of solidifying liquid, for example 2 or 3 filling openings may be provided that are spaced apart along a longitudinal edge at the front and/or rear face of a wall part, i.e. spaced apart with interspaces of about 2-7 meter, preferably between about 3-6 meters, for example about 2.5 meters or 5 meters.

Filling of a cavity between two wall parts with solidifying liquid may take place by first filling the cavity over a part of its height via a first filling opening. Then, a next filling opening positioned in upward direction along the longitudinal edge of the wall part may be used to fill the cavity until solidifying liquid spills out of the first lower filling opening. The first filling opening is then plugged, i.e. with a plug or similar. Further filling of the cavity in upward direction along the longitudinal edge takes place in a similar manner, e.g. by filling solidifying liquid in a next filling opening positioned in upward direction along a longitudinal edge of a wall part until the solidifying liquid spills out of the previous lower filling opening, after which this opening is plugged. In another embodiment selected filling openings for filling solidifying liquid into the cavity are not used in one application, but may be used in a different application, and are plugged if not needed.

When building a tower of prefabricated wall parts, multiple first cavities at the same height level may be filled consecutively, by filling solidifying liquid into the cavity via a first filling opening. After all cavities spaced apart in circumferential direction of a tower ring section have been filled via their respective first filling opening, the process is repeated for second, upward filling openings of the wall sections, wherein again, the second filling opening is positioned at a higher level along a longitudinal edge of a wall part.

By using one or more filling openings to fill a cavity between two wall parts with solidifying liquid, the pressure on the joints may be reduced, as a shorter column of solidifying liquid is poured into the cavity compared to the column height of a full cavity. This gives the solidifying liquid more time to settle at each filled section, reducing the peak pressures on the sealing members.

The invention will further be elucidated on the basis of exemplary embodiments which are represented in the drawings. The exemplary embodiments are given by way of non-limitative illustration of the invention.

In the drawings.

It is noted that the figures are only schematic representations of embodiments of the invention that are given by way of non-limited example. In the figures, the same or corresponding parts are designated with the same reference numerals.

Figure 1:
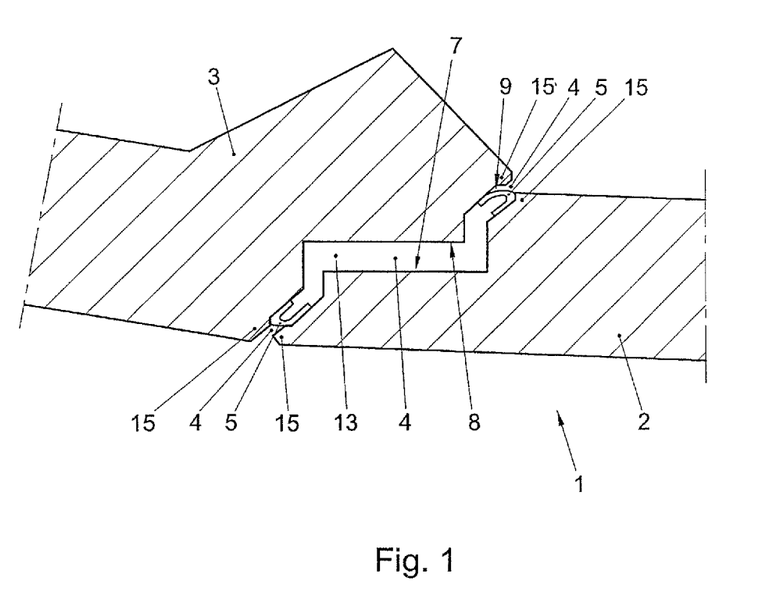
FIG. 1 shows a schematic cross-sectional view of a construction assembly according to a first embodiment of the invention.

FIG. 1 shows a wall assembly 1, including at least two prefabricated wall parts 2, 3 of which edge surfaces 7, 8 are placed against each other leaving a gap 4 there between, in which gap 4 first and second sealing members 5 are included that act between said edge surfaces 7, 8 of the wall parts. The sealing members 5 extend in a longitudinal direction of said edge surfaces 7, 8 and are spaced apart in a transverse direction of said edge surfaces to define a cavity 13 there between.

Figure 3:
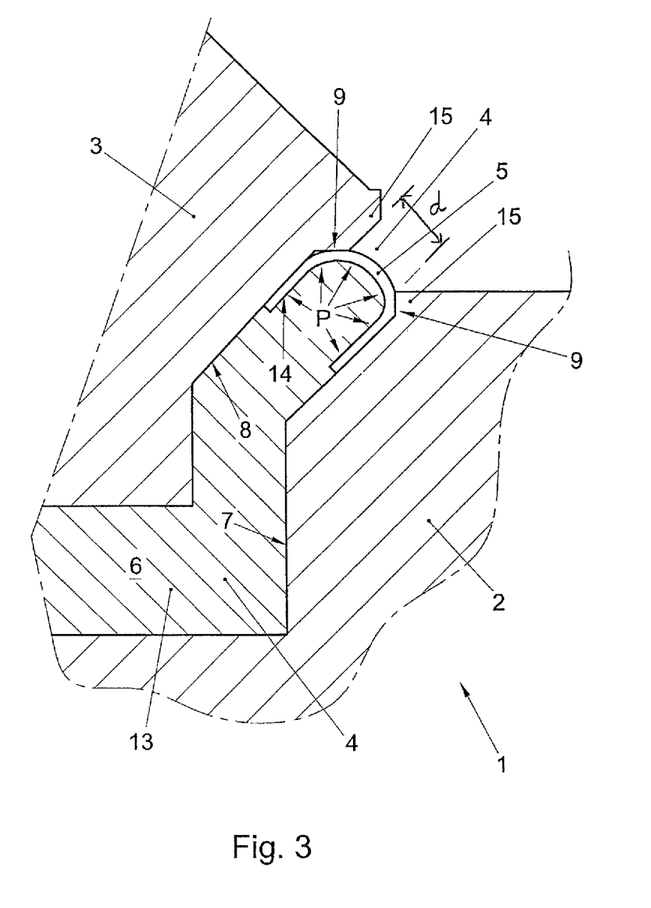
FIG. 3 shows a schematic cross-sectional view of a close-up of a construction assembly according to a third embodiment of the invention, wherein a sealing member is kept between wall parts and stop and/or guide portions.
Figure 4:
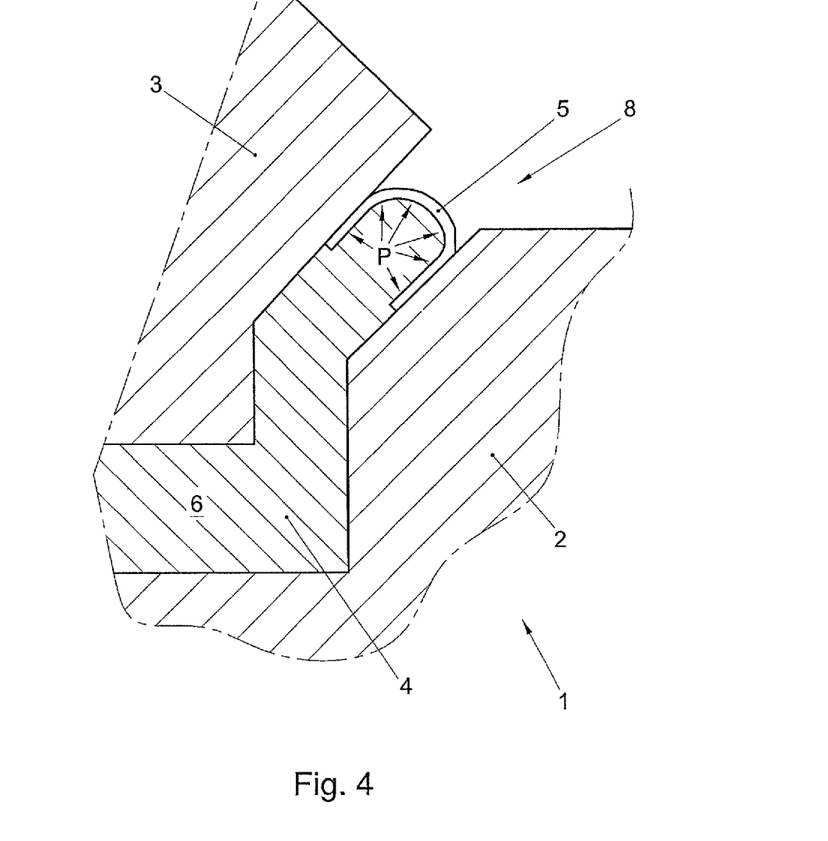
FIG. 4 shows a schematic cross-sectional view of a close-up of a construction assembly according to a fourth embodiment of the invention, wherein the sealing member provided between wall parts.

In FIGS. 3 and 4, the cavity 13 is filled with a solidified liquid 6, such that the solidified liquid 6 acts on a cavity facing surface 14 of each sealing member and presses the sealing member 5 into engagement with at least one of the edge surfaces 7, 8.

The sealing member 5 may be pressed against the edge surfaces 7, 8 creating an improved sealing of the cavity 13 by a pressure force P of the solidifying fluid during filling of the cavity and/or solidified fluid working on the cavity facing surface 14 of the sealing members 5. The pressure forces may be transferred via the sealing member 5 and passed onto the edge surface 7, 8 in the region where the sealing member 5 and the edge surface 7, 8 are in contact. The extra pressure force P pressing part of the sealing member 5 against the edge surfaces 7, 8 may create an extra friction between the edge surface 7, 8 and the sealing member 5, such that the sealing member 5 may withstand more pressure P of the solidified liquid 6 that may act on the sealing member 5 to push the sealing member out of the gap 4, where the sealing member 5 is not in contact with the edge surfaces 7, 8. The cavity 13 may be protected against environmental influences. Therefore, the sealing members 5 may form a watertight seal against ingress of water into the cavity 13.

Figure 2:
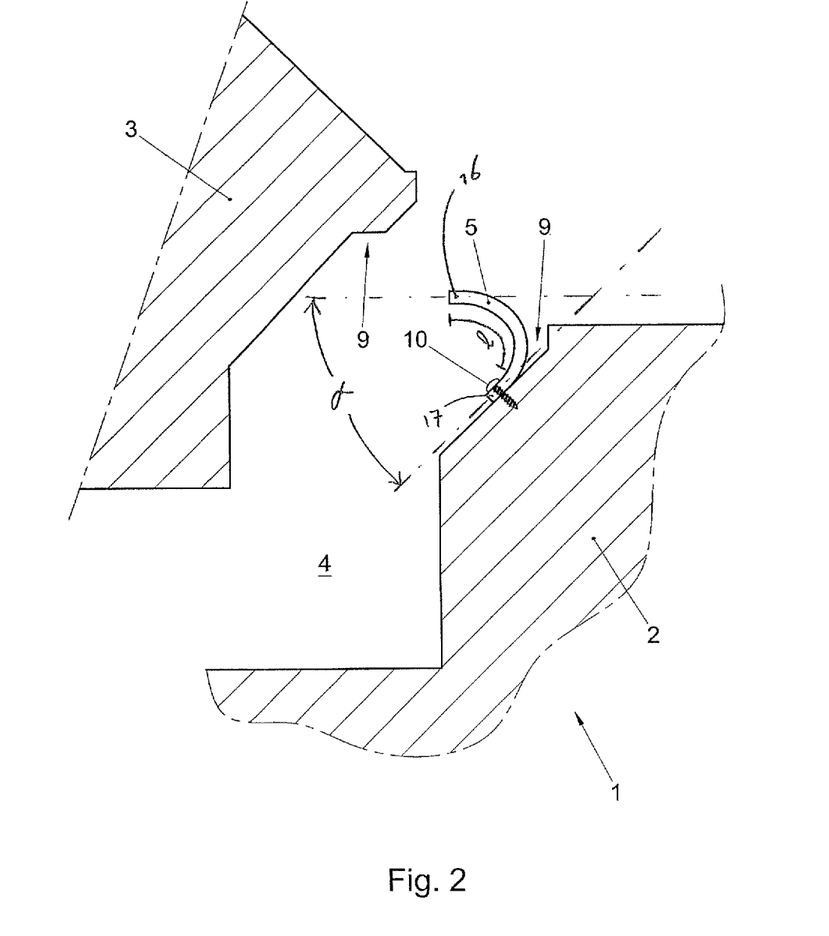
FIG. 2 shows a schematic cross-sectional view of a close-up of a construction assembly according to a second embodiment of the wall parts being assembled.

FIGS. 1-3 show that facing edge surfaces 7, 8 may comprise stop portions 15 that converge in outward direction of the cavity 13 to prevent the sealing members 5 from outward movement relative to the cavity 13. As the pressure force P in the cavity 13 may be twice the atmospheric pressure, the pressure force P that may push the sealing member 5 out of the gap 4 may be counteracted by the stop portions 15. By narrowing the cavity 4 towards an outside direction of the cavity 13, the sealing members 5 are inheritably blocked as the passage towards an outward direction of the cavity 18 gets smaller. A distance d between two facing stop portions 15 of two wall parts placed side by side may be several centimeters, and may e.g. range between 0.5-4 cm, preferably 1-3 cm, in particular approximately 1.5 cm.

The cavity facing surfaces 14 of said sealing members 5 may comprise a concave portion. In FIGS. 1-5 the sealing members 5 are substantially U-shaped and therefore have a concave portion. By providing the cavity facing surface 14 of the sealing members 5 with a concave portion, the pressure forces P are directed to push the sealing member 5 against the edge surfaces 7, 8 and also in the direction out of the gap 4. This may result in an extra force P pressing the sealing members onto the edge surfaces 7, 8.

Furthermore, the sealing members 5 may be shaped, such that they include a lip 5. The lip 5 may comprise a base portion 17 that is carried on one of the edge surfaces 7, 8 and a free edge 16 of the lip 5 may cooperate with a guide portion 9 of the facing edge surface 7, 8. The base portion 17 may be fixedly connected to the edge surface 7, 8 of the wall part 2, 3 by means of a screw 10, as depicted in FIG. 2, but may also be connected by using bolts or adhesive or any other connection means. The adhesive can be usual contact adhesive, but comprises preferably at least Koerapren FU 2030 (DS contact adhesive 650) or Koerapren TH 670. The lip 5 preferably has a length l that is at least twice the nominal distance d between the wall parts 2, more preferably at least 2.5 the length, for example 3 times the length.

A free edge 16 of the lip 5 preferably extends, when in an uncompressed state, in a direction including a sharp angle α with the part of the edge surface 7,8 to which it is mounted, of about 35-55 degrees, preferably 40-50 degrees in particular about 45 degrees. The free edge of the lip is preferably directed towards the inside of the cavity, i.e. away from the inner/outer surface of the wall.

Generally, the sealing member 5 is comprised of a base part 17 for mounting on the wall parts 7, 8. Lips with free edges 16 extend from said base part and may be substantially straight or partly or entirely curved, such that they may be "flap like". The base part 17 and the lips with free edges 16 can be made of a thin walled profile, e.g. with an average thickness of several mm, e.g. ranging between 2-7 mm, preferably 3-6 mm, in particular about 5 mm. An angle between a line coinciding with the pointing direction of the tip of the lip 5 and the longitudinal direction of the first part may be similar or equal to the angle α.

The guide portion 9 may be provided at the edge surface 7, 8 of a wall part 2, 3 on which the free edge 16 of the lip may cooperate with. The guide portion 9 may comprise a boss or notch that may have a guide surface 18, wherein the guide portion 9 may be integrally formed with the edge surface 7, 8 of wall part 7, 8. The guide portion 9 may also be realized by providing a recess in the edge surface 7, 8. The guide portion 9 may cooperate during assembly to form an adequately sealed cavity 13. FIG. 2 depicts, that by guiding wall part 2 in the direction of the arrow towards wall part 3, the free edge 16 of the lip of the sealing member 5 may be brought in a desired shape and onto a desired position against the edge surface 7, 8 as depicted in FIG. 3. The guide portion 9 may also ensure that during misalignment in the assembling process of the two wall parts, the misalignment can be compensated such that the cavity is still properly sealed. It should be clear that the sealing member 5 may also be fixedly connected to the second wall part 3 and the moved towards the first wall part 2 or any other variation.

The guide portion 9 may help the free edge 16 of the sealing lip to curl towards the inward direction of the cavity 13.

The guide portion 9 on either one of the wall parts 2, 3 may ensure that the sealing member 5 will not accidentally open or gape, as to prevent environmental influences like water to enter into the cavity 13. However, even if no guide portions 9 are provided for the sealing member 5 to engage with while assembling the wall parts 2, 3, as shown in FIG. 4, the sealing member 5 may at all times be able to compensate for any movements or misalignments of the wall assembly 1 and be able to seal the cavity 13 tightly, wherein the free edge 16 of the lip 5 may be curled inwardly towards the cavity 13.

The stop portion 15 may be forming the guide portion or vice versa. The edge surface 7, 8 may be comprised of components, e.g. stop portions 15 and/or guide portions 9 and wall parts 2, 3. The components may be integrally formed with the edge surface 7, 8.

By having the cavity 13 filled with solidified liquid, forces acting on the wall assembly 1 may be better transferred from one wall part to the other. Also, the solidified liquid 6 may make the assembly more stiff and/or rigid.

The first wall part 2 and the second wall part 3 may be fixedly connected to each other by means of a mechanical connection. The mechanical connection may comprise a screw connection and/or a hook-hook connection and/or a pin-hole connection. For example, FIG. 5 depicts that the first and second wall part 2, 3 may comprise at least one ring 11.

The at least one ring 11 may be attached to the wall parts 2, 3 during manufacturing of the wall part or may be applied during assembly. When placing the first and second wall part 2, 3 to form a gap 4, both rings 11 may be placed over each other in a layered fashion, whereafter a securing pin 12 is placed through the rings to connect the two wall parts 2, 3 with respect to each other. However, the wall parts may be connected in any other way generally known in the construction industry.

Figure 5:
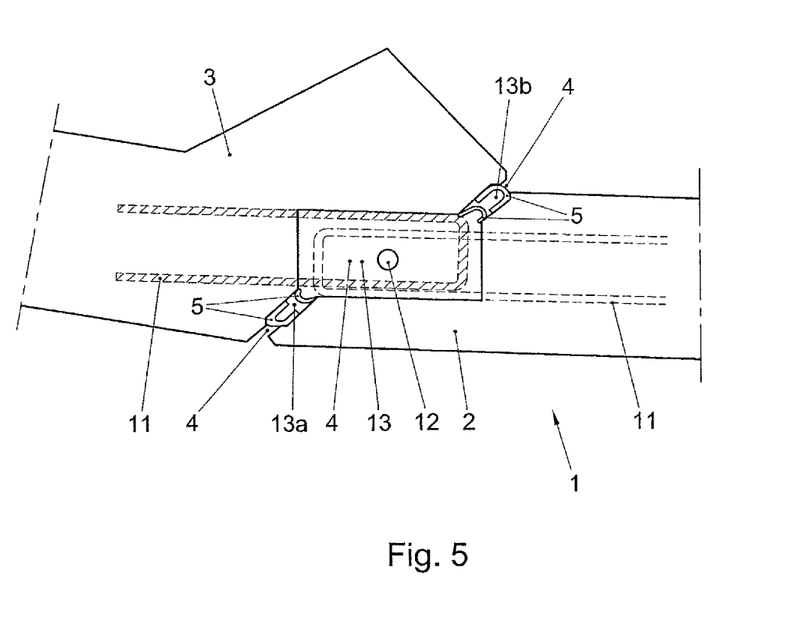
FIG. 5 shows a schematic cross-sectional view of a construction assembly according to a fifth embodiment of the invention, wherein the constructions elements are connected to each other by means of a connection.

The gap 4 may comprise at least one other set of sealing members 5, creating two more cavities 13a and 13b as depicted in FIG. 5. The different cavities may be filled with different solidifying liquids. For example cavities 13a and 13b may be filled with mortar, whereas cavity 13 may be filled with foam that when hardened, remains flexible. By making the center cavity 13 flexible it may be ensured that the solidified liquid may not crack easily and may give the wall assembly some flexibility in case one wall part 2 moves relative to the other wall part 3 or vice versa.

Figure 6:
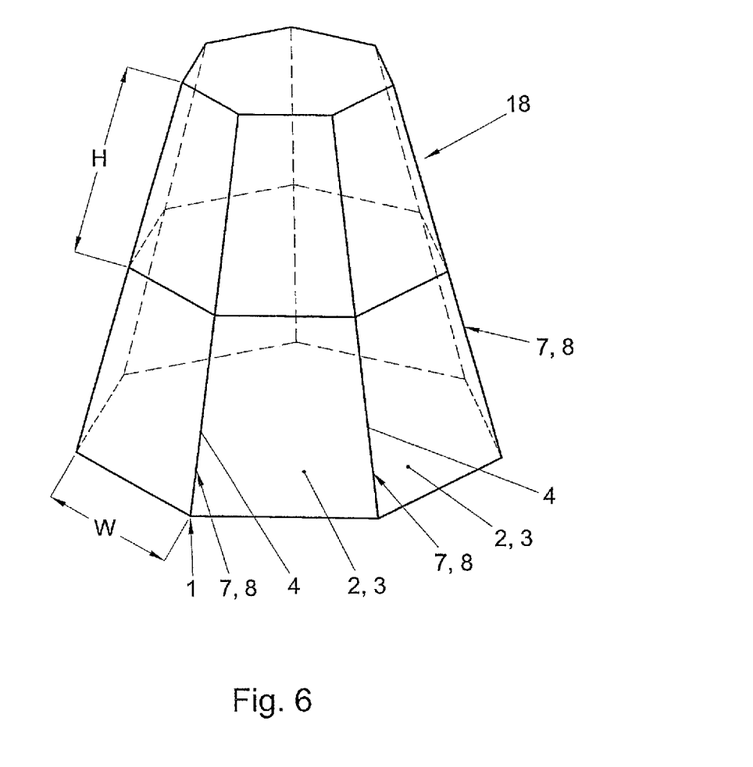
FIG. 6 shows a perspective view of a tower comprised of wall parts, assembled according to the invention.

The wall assembly 1 may be used for building a tower 18 of which the wall includes a number of upward, elongate prefabricated wall parts 2, 3 that are placed with their longitudinal edge surfaces 7, 8 against each other side by side to form a wall assembly 1 wherein the gaps 4 formed between two facing edge surfaces 7, 8 of two consecutive wall parts 2, 3 are sealed according to the foregoing. The tower 18 may be used for constructing wind turbines. Due to the high electric currents flowing through electric wiring on the inside of the tower 18, it is important that the inside of the tower 18 is adequately sealed against the ingress of water due to environmental influences that may cause damage or dangerous short wiring.

The elongate prefabricated wall parts 2, 3 may be twice higher than the greatest dimension of the wall part, e.g. the width W. A typical height H of a prefabricated wall section of a wind turbine tower may be between 15-30 meters. Filling a height H of a gap 4 of 15-30 meters between two such wall section 2, 3 may induce liquid pressures of more then twice the atmospheric pressures. It should be noted that by using sealing members comprising a lip, forces acting between the wall parts and the sealing members may be governed substantially by shear forces, where substantially no momentum forces are present when the cavity is filled or being filled by a solidifying liquid. This reduces the chances of parts of the wall parts breaking off, in particular at a region of the wall part, where the sealing member is attached to.

The invention is not limited to the here shown embodiments of the invention. It shall be readily apprehensible to the skilled person that many variants are possible, which are understood to be comprised within the scope of the invention defined in the appended claims.

The invention claimed is:

1. A method of assembling a wall from prefabricated wall parts, wherein edge surfaces of two wall parts are placed against each other leaving a gap there between, and wherein first and second sealing members are included in the gap to each act between said edge surfaces of the wall parts, which sealing members extend in a longitudinal direction of said edge surfaces and are spaced apart in a transverse direction of said edge surfaces to define a cavity there between, wherein the method comprises the step of providing the first and second sealing members to the edge surfaces of the wall parts prior to assembly, characterized in that each of the selling members includes a lip of flexible material having a hardness of between 30-100 durometer hardness on a Shore A scale, each lip comprising a base portion fixedly connected to one of the edge surfaces and a free edge portion, and wherein, upon placement of the edge surfaces against each other, the free edge of the lip of a sealing member is guided to curl inwardly relative to the cavity by a guide portion on the edge surface of the facing prefabricated wall element, and wherein said cavity is filled with a solidifying liquid, such that the solidifying liquid acts on a cavity facing surface of each sealing member and presses the sealing member into engagement with at least one of the edge surfaces.

2. A method of assembling a wall from prefabricated wall parts according to claim 1, wherein the sealing members are compressed when the two wall parts are placed against each other.

3. A method of assembling a wall from prefabricated wall parts according to claim 1 wherein at least the lip of each sealing member is a thin walled profile.

4. A method of assembling a wall from prefabricated wall parts according to claim 1 wherein the solidifying liquid has a viscosity that is greater than the viscosity of water, and wherein the solidifying liquid builds up a pressure in the cavity that is greater than twice the atmospheric pressure.

5. A method of assembling a wall from prefabricated wall parts according to claim 1 wherein the rust wall part and the second wall part are fixedly connected to each other.

6. A method of assembling a wall from prefabricated wall parts according to claim 1, wherein the flexible material has a hardness of between 50-90 durometer hardness on the Shore A scale.

7. A method of assembling a wall from prefabricated wall parts according to claim 1, wherein filling the cavity with solidifying liquid is performed by pouring solidifying liquid into said cavity via one or more filling openings on the front and/or rear faces of the wall parts, along lateral edges of the wall parts.

8. A wall assembly, including at least two prefabricated wall parts of which edge surfaces are placed against each other leaving a gap there between, in which gap first and second sealing members are included that act between said edge surfaces of the wall parts, which sealing members extend in a longitudinal direction of said edge surfaces and are spaced apart in a transverse direction of said edge surfaces to define a cavity there between, wherein each of the sealing members is connected to a wall characterized in that each of the sealing members connected to a wall part includes a lip made of flexible material having a hardness of between 30-100 durometer hardness on a Shore A scale and comprises a base portion fixedly connected to one of the edge surfaces and a free edge portion. and wherein the free edge of the lip of each seam member curls inwardly relative to the cavity by a guide portion on the edge surface of the facing prefabricated wall element, and wherein said cavity is filled with a solidified liquid, such that the solidified liquid acts on a cavity facing surface of each sealing member and presses the sealing member into engagement with at least one of the edge surfaces.

9. A wall assembly according to claim 8 wherein at least the lip of each member is a thin walled profile.

10. A wall assembly according to claim 8 wherein the facing edge surfaces comprise stop portions that converge in outward direction of the cavity to prevent the sealing members from outward movement relative to the cavity.

11. A wall assembly according to claim 8 wherein the cavity facing surfaces of said sealing members comprise a concave portion.

12. A wall assembly according to claim 8 wherein one or more filling openings are provided on front and/or rear faces of the wall parts along lateral edges of the wall parts.

13. A tower of which the wall includes a number of upward, elongate prefabricated wall parts that ere placed with their longitudinal edge surfaces against each other side by side to form a wall assembly in accordance with claim 8.

14. A wall assembly according to claim 8, wherein the flexible material has a hardness of between 50-90 durometer hardness on the Shore A scale.

\* \* \* \* \*